United States Patent
Mesuda

(10) Patent No.: US 9,466,840 B2
(45) Date of Patent: Oct. 11, 2016

(54) POSITIVE ELECTRODE PASTE AND MANUFACTURING METHOD THEREFOR

(71) Applicant: TOYOTA JIDOSHA KABUSHIKI KAISHA, Toyota-shi, Aichi-ken (JP)

(72) Inventor: Tomoya Mesuda, Toyota (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 0 days.

(21) Appl. No.: 14/685,725

(22) Filed: Apr. 14, 2015

(65) Prior Publication Data

US 2015/0333333 A1 Nov. 19, 2015

(30) Foreign Application Priority Data

May 14, 2014 (JP) ................. 2014-100350

(51) Int. Cl.
*H01M 4/62* (2006.01)
*H01M 4/131* (2010.01)
*H01M 4/13* (2010.01)

(52) U.S. Cl.
CPC ............. *H01M 4/622* (2013.01); *H01M 4/131* (2013.01); *H01M 4/623* (2013.01); *H01M 4/13* (2013.01); *Y02E 60/122* (2013.01)

(58) Field of Classification Search
CPC .................................................... H01M 4/623
See application file for complete search history.

(56) References Cited

FOREIGN PATENT DOCUMENTS

| JP | 09-274919 A | | 10/1997 |
|----|----|----|----|
| JP | 2006-253091 A | | 9/2006 |
| JP | 2012-064542 A | * | 3/2012 |
| JP | 2012-195289 A | | 10/2012 |
| JP | 2013-89485 A | | 5/2013 |
| JP | 2013-171816 A | | 9/2013 |

OTHER PUBLICATIONS

English machine translation of Fujiwara et al., JP 2012-064542A (2012).*

* cited by examiner

*Primary Examiner* — Peter F Godenschwager
(74) *Attorney, Agent, or Firm* — Sughrue Mion, PLLC

(57) ABSTRACT

A positive electrode paste for a non-aqueous electrolyte secondary battery is provided. The positive electrode paste includes a binder and a positive electrode active material. The binder includes a resin including polyvinyl acetal as a basic skeleton, the resin having a weight average molecular weight of 50000 to 140000 and having a hydroxyl group content of 42 to 60 mol %; and polyvinylidene fluoride having a weight average molecular weight of 800000 to 1200000.

3 Claims, 2 Drawing Sheets

POSITIVE ELECTRODE PASTE AND MANUFACTURING METHOD THEREFOR

INCORPORATION BY REFERENCE

This application is based upon and claims the benefit of priority from Japanese patent application No. 2014-100350, filed on May 14, 2014, the disclosure of which is incorporated herein in its entirety by reference.

BACKGROUND OF THE INVENTION

1. Field of the Invention

The present invention relates to a positive electrode paste and a manufacturing method therefor, and more particularly, to a positive electrode paste for a non-aqueous electrolyte secondary battery and a manufacturing method therefor.

2. Description of Related Art

A lithium-ion secondary battery is a non-aqueous electrolyte secondary battery which can be charged and discharged by causing lithium ions to migrate in a non-aqueous electrolyte between a positive electrode and a negative electrode which occlude and release lithium ions. In recent years, high-capacity lithium-ion secondary batteries have been mounted on electric vehicles (EVs) and plug-in hybrid vehicle (PHVs).

Each of the positive electrode and the negative electrode of such a lithium-ion secondary battery has a layered structure in which an active material layer is formed on a collector. The active material layer is formed by press working after an electrode paste (a positive electrode paste or a negative electrode paste), which includes, for example, an active material, a binder, and a solvent, is applied onto the collector and dried Japanese Unexamined Patent Application Publication No. 2006-253091 discloses a positive electrode paste including: a first binder which is made of a polymer including vinylidene fluoride as a component; and a second binder which is made of at least one material selected from the group consisting of a polyvinyl acetal and a derivative thereof.

SUMMARY OF THE INVENTION

The present inventors have found the following problem related to the positive electrode paste disclosed in Japanese Unexamined Patent Application Publication No. 2006-253091.

As mentioned above, the positive electrode is formed by press working after the produced positive electrode paste is applied onto the collector and dried. From the viewpoint of improvement in the productivity of the electrode, it is preferable that the applied positive electrode paste be dried at a faster rate. As a matter of course, it is necessary to improve the ratio of the solid content of the positive electrode paste (in other words, to decrease the ratio of the solvent) so that the applied positive electrode paste can be dried at a faster rate.

FIG. 1 is a graph showing the shear-rate dependence of the viscosity of the positive electrode paste.

In the positive electrode paste disclosed in Japanese Unexamined Patent Application Publication No. 2006-253091, when the ratio of the solid content is simply increased, the viscosity of the positive electrode paste increases. In this case, as shown in a viscosity curve A in FIG. 1, the viscosity of the positive electrode paste increases especially at a high shear rate u2 (for example, about 10000/s), which causes deterioration in the coatability of the positive electrode paste on the collector.

In this regard, if the amount of the binder is reduced, an increase in the viscosity in a high shear rate region can be suppressed as indicated by a viscosity curve B in FIG. 1. However, in this case, the viscosity of the positive electrode paste at a low shear rate u1 (for example, about 0.1/s) also decreases. As a result, a phenomenon (so-called migration) occurs in which the binder included in the positive electrode paste migrates from the interface between the positive electrode paste and the collector to a surface layer side of the positive electrode paste in a drying process. This leads to a reduction in the strength of adhesion of the binder with the collector.

FIG. 2 is a sectional view schematically showing the migration of the binder. As shown in FIG. 2, when a positive electrode paste 2, which is applied onto a collector 1, is dried by blowing hot air from the surface layer side of the positive electrode paste 2, a binder 22 included in the positive electrode paste 2 passes through gaps between active materials 21 as indicated by dashed arrows and migrates from the vicinity of the interface between the positive electrode paste 2 and the collector 1 to the surface layer side of the positive electrode paste 2 during evaporation of the solvent. Note that the migration is promoted by increasing the rate of drying.

The present invention has been made in view of the above-mentioned circumstances, and an object of the present invention is to provide a positive electrode paste which can be dried at a faster rate, while deterioration in the coatability of the positive electrode paste and a reduction in the adhesion strength of the positive electrode paste can be suppressed.

A first exemplary aspect of the present invention is a positive electrode paste for a non-aqueous electrolyte secondary battery, including: a binder; and a positive electrode active material. The binder includes: a resin including polyvinyl acetal as a basic skeleton, the resin having a weight average molecular weight of 50000 to 140000 and having a hydroxyl group content of 42 to 60 mol %; and polyvinylidene fluoride having a weight average molecular weight of 800000 to 1200000.

With this structure, the positive electrode paste can be dried at a faster rate, while deterioration in the coatability of the positive electrode paste and a reduction in the adhesion strength of the positive electrode paste can be suppressed.

It is preferable that a ratio of a solid content to the positive electrode paste be 60 mass % or more. This structure makes it possible to more reliably dry the positive electrode paste at a faster rate.

It is also preferable that a content of the resin including polyvinyl acetal as the basic skeleton is 0.1 mass % or more in a solid content of the positive electrode paste; a content of the polyvinylidene fluoride is 1.0 mass % or more in the solid content; and a total content of the resin including polyvinyl acetal as the basic skeleton and the polyvinylidene fluoride be 3.0 mass % or less in the solid content. This structure makes it possible to more reliably suppress deterioration in the coatability of the positive electrode paste and a reduction in the adhesion strength of the positive electrode paste.

According to the present invention, it is possible to provide a positive electrode paste which can be dried at a faster rate, while deterioration in the coatability of the positive electrode paste and a reduction in the adhesion strength of the positive electrode paste can be suppressed.

The above and other objects, features and advantages of the present invention will become more fully understood from the detailed description given hereinbelow and the accompanying drawings which are given by way of illustration only, and thus are not to be considered as limiting the present invention.

DESCRIPTION OF THE EXEMPLARY EMBODIMENTS

Figure 1:
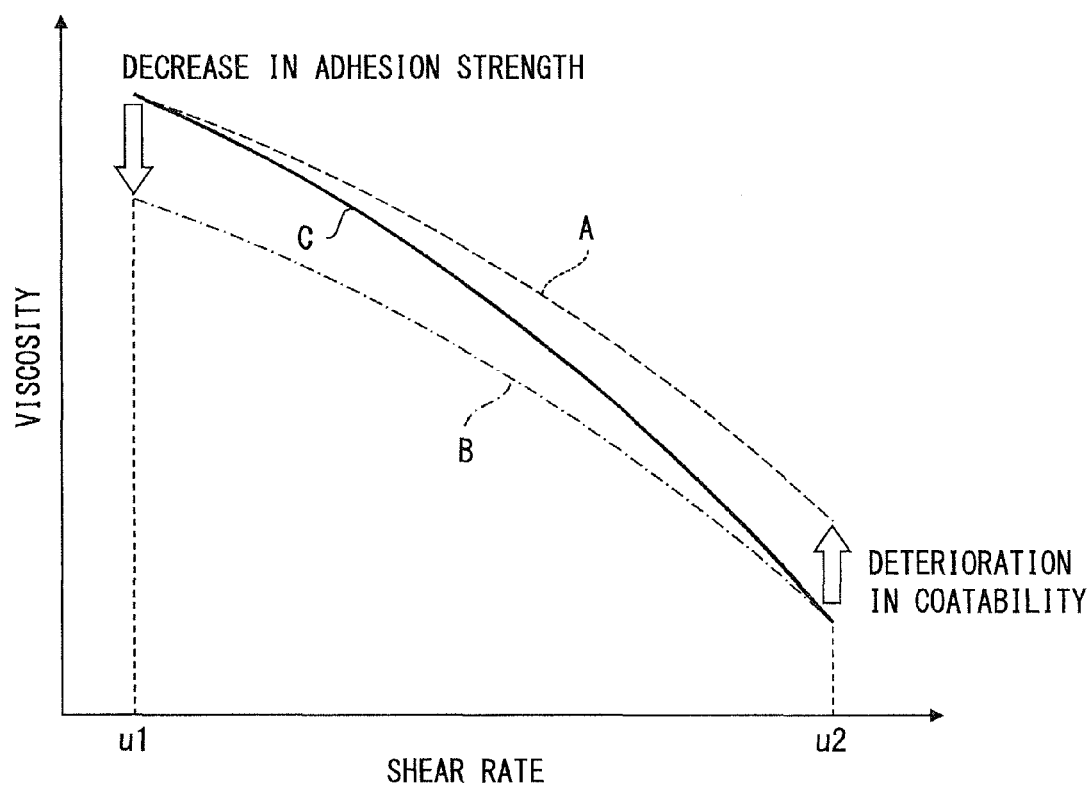
FIG. 1 is a graph showing the shear-rate dependence of the viscosity of a positive electrode paste.
Figure 2:
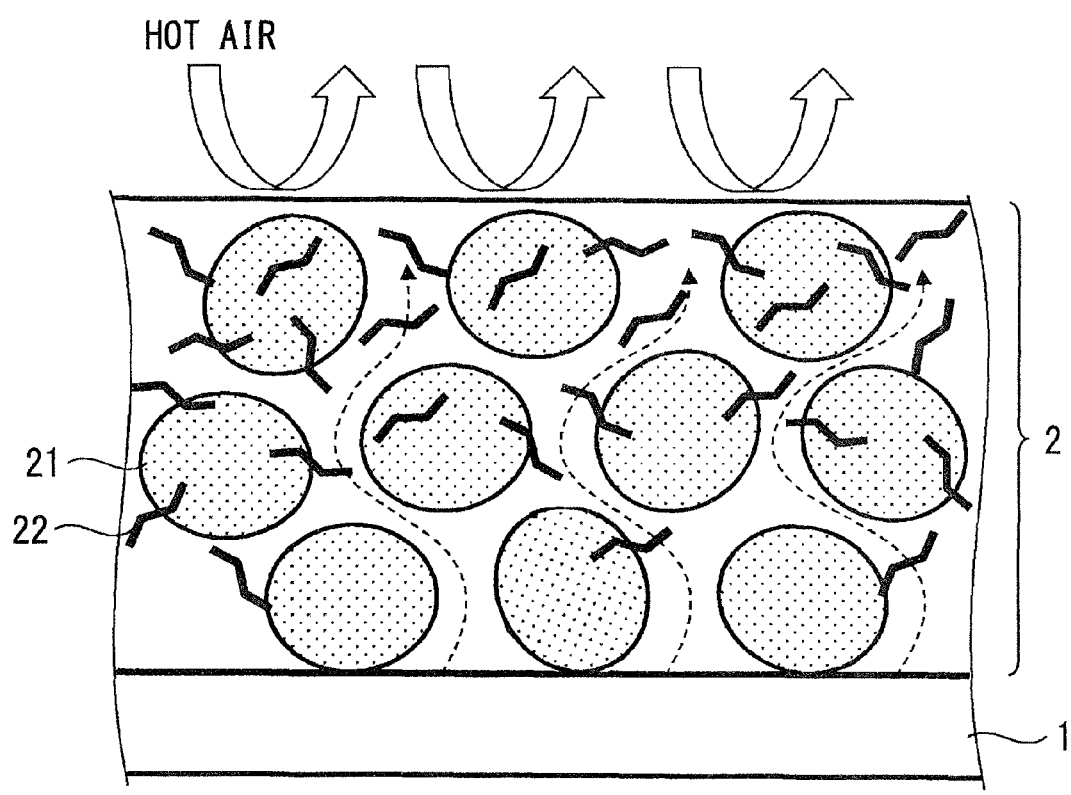
FIG. 2 is a sectional view schematically showing the migration of a binder.

Specific embodiments of the present invention will be described in detail below. However, the present invention is not limited to the following exemplary embodiments. For clarity of explanation, the following description is simplified as appropriate.

Manufacturing Method for a Lithium-Ion Secondary Battery

First, a manufacturing method for a lithium-ion secondary battery to which a positive electrode paste according to the present invention is applied will be described.

A positive electrode paste including a positive electrode active material, a conductive material, a binder, and a solvent is applied onto both surfaces of a band-like positive electrode collector and is dried. After that, a sheet-like positive electrode is formed by press working.

In this case, for example, a metal foil made of aluminum or an aluminum alloy is used as the positive electrode collector.

For example, lithium cobaltate ($LiCoO_2$), lithium manganate ($LiMn_2O_4$), or lithium nickelate ($LiNiO_2$) is used as the positive electrode active material included in the positive electrode paste. In another alternative, a material obtained by mixing $LiCoO_2$, $LiMn_2O_4$, and $LiNiO_2$ at a given ratio and burning the mixture can be used. An example of the composition thereof is $LiNi_{1/3}Co_{1/3}Mn_{1/3}O_2$ which is obtained by mixing these materials at an equal ratio.

As the conductive material, for example, acetylene black (AB), carbon black such as ketjen black, or graphite is used.

The binder includes a resin including polyvinyl acetal (PVA) as a basic skeleton, and polyvinylidene fluoride (PVdF).

As the solvent, for example, an NMP (N-methyl-2-pyrrolidone) solution is used.

Details of the positive electrode paste according to the present invention will be described later.

On the other hand, a negative electrode paste including a negative electrode active material, a binder, a thickener, and a solvent is applied onto both surfaces of a band-like negative electrode collector and is dried. After that, a sheet-like negative electrode is formed by press working.

In this case, for example, a metal foil made of copper, nickel, or an alloy thereof is used as the negative electrode collector.

For example, natural graphite powder or amorphous-coated graphite powder obtained by coating natural graphite powder with amorphous carbon is used as the negative electrode active material included in the negative electrode paste.

As the binder, for example, styrene-butadiene rubber (SBR) is used.

As the thickener, for example, carboxymethyl cellulose (CMC) is used.

As the solvent, for example, water is used.

Next, the positive electrode and the negative electrode are laminated with a sheet-like separator interposed therebetween and wound, and then they are pressed from the side surface direction, thereby forming a wound electrode body.

In this case, as the separator, a porous polymer membrane such as a polyethylene membrane, a polyolefin membrane, a polyvinyl chloride membrane, or an ionic conductive polymer electrolyte membrane can be used. These membranes may be used alone or in combination.

Lastly, the wound electrode body is accommodated in a battery case and a non-aqueous electrolyte is injected into the battery case. After that, the battery case is sealed, thereby obtaining a lithium-ion secondary battery.

In this case, the non-aqueous electrolyte is a composition in which a supporting electrolyte is included in a non-aqueous solvent. As the non-aqueous solvent, for example, one or more materials selected from the group consisting of propylene carbonate (PC), ethylene carbonate (EC), diethyl carbonate (DEC), dimethyl carbonate (DMC), ethyl methyl carbonate (EMC), and the like are used. As the supporting electrolyte, for example, one or more types of lithium compounds (lithium salt) selected from the group consisting of $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, and LiI are used.

Positive Electrode Paste

Next, details of the positive electrode paste according to the present invention will be described. As described above, the positive electrode paste according to the present invention includes a lithium oxide as an active material; a carbon black as a conductive material; PVdF and a resin including polyvinyl acetal (PVA) as a basic skeleton as binders; and NMP as a solvent.

In this case, examples of the resin including polyvinyl acetal as the basic skeleton include not only so-called polyvinyl acetal resins, such as poly(vinyl formal) and poly(vinyl butyral), but also resins including the basic skeleton of these resins. For example, poly(vinyl butyral) is a random copolymer which includes a hydroxyl group, an acetyl group, and a butyral group, and in which three monomers are randomly combined. If another substance is added to this poly(vinyl butyral) to produce a random copolymer of four monomers, the random copolymer is not a so-called poly(vinyl butyral) resin any more, but has the same effect as that of a poly(vinyl butyral) resin. Thus, the resin including polyvinyl acetal as the basic skeleton used herein includes a random copolymer produced by adding another substance to so-called polyvinyl acetal. The resin including polyvinyl acetal as the basic skeletone is hereinafter referred to simply as PVA.

In the positive electrode paste according to the present invention, the ratio (solid content ratio) of the solid content (the active material, the conductive material, and the binder) to the entire positive electrode paste is 60 mass % or more (i.e., the ratio of the NMP, which is the solvent, is 40 mass % or less). Accordingly, the positive electrode paste can be dried at a faster rate than that of the positive electrode paste of the related art having a solid content ratio of about 30 to 50 mass %.

The PVdF included as the binder in the positive electrode paste has a weight average molecular weight Mw of 800000 to 1200000. The content of the PVdF in the solid content of the positive electrode paste is preferably 1.0 mass % or more. If the weight average molecular weight Mw of the PVdF is less than 800000, the viscosity of the positive electrode paste in a low shear rate region is low, and migration occurs during a drying process, which results in deterioration of the adhesion strength. On the other hand, if the weight average molecular weight Mw of the PVdF exceeds 1200000, the viscosity of the positive electrode paste in a high shear rate region is extremely high, which results in deterioration of the coatability.

In this case, it is considered that the viscosity of the positive electrode paste in a low shear rate region depends not on the mass of the binder included in the positive electrode paste, but mainly on the molecular weight of the binder included therein. Accordingly, even when a small amount of PVdF is added, the migration of the binder during the drying process and a reduction in the adhesion strength between the collector and the positive electrode active material layer formed by drying the positive electrode paste can be suppressed by setting the weight average molecular weight Mw to 800000 or more.

The PVA included as the binder in the positive electrode paste has the weight average molecular weight Mw of 50000 to 140000, and includes a hydroxyl group in a range from 42 to 60 mol %. The content of the PVA in the solid content of the positive electrode paste is preferably 0.1 mass % or more. Since the positive electrode paste includes not only the PVdF but also the PVA, it is considered that the viscosity of the positive electrode paste in the high shear rate region can be reduced. Accordingly, the coatability of the positive electrode paste onto the collector is excellent. Note that the PVA also functions as a dispersant for dispersing the conductive material to thereby prevent aggregation.

If the weight average molecular weight Mw of the PVA is less than 50000, the function of the PVA as a dispersant is insufficient and the viscosity of the positive electrode paste in the high shear rate region is high, which results in deterioration of the coatability thereof. If the weight average molecular weight Mw is 50000 or more, the function of the PVA as a dispersant is sufficient and the viscosity of the positive electrode paste in the high shear rate region is low. In this case, the viscosity of the positive electrode paste in the high shear rate region increases in accordance with an increase in the weight average molecular weight Mw. Accordingly, if the weight average molecular weight Mw of the PVA exceeds 140000, the viscosity of the positive electrode paste in the high shear rate region is extremely high, which results in deterioration of the coatability thereof.

The hydroxyl group in the PVA improves the adhesion strength between the collector and the positive electrode active material layer formed by drying the positive electrode paste. If the hydroxyl group content of the PVA is less than 42 mol %, the adhesion strength between the positive electrode active material layer and the collector is insufficient. On the other hand, if the hydroxyl group content of the PVA exceeds 60 mol %, the viscosity of the positive electrode paste in the high shear rate region is high, which results in deterioration of the coatability thereof.

Note that if the total amount of the PVA and PVdF to be added exceeds 3.0 mass % in the solid content, the viscosity of the positive electrode paste in the high shear rate region increases, which results in deterioration of the coatability of the positive electrode paste onto a collector. Accordingly, the total amount of the PVA and PVdF to be added is preferably 3.0 mass % or less in the solid content.

Referring now to FIG. 1, the advantageous effects of the positive electrode paste according to the present invention will be described. As indicated by a viscosity curve C shown in FIG. 1, the positive electrode paste according to the present invention has a high viscosity at a low shear rate u1 (for example, about 0.1/s), so that a reduction in the adhesion strength due to migration can be suppressed. At the same time, the positive electrode paste according to the present invention has a low viscosity at a high shear rate u2 (for example, about 10000/s), and thus the coatability of the positive electrode paste onto the collector is excellent. In other words, the positive electrode paste according to the present invention can be dried at a faster rate, while deterioration in the coatability of the positive electrode paste and a reduction in the adhesion strength of the positive electrode paste can be suppressed.

The positive electrode paste according to the present invention can be continuously manufactured by injecting and kneading the active material, the conductive material, the binder, and the solvent in, for example, a two-axle kneading/extruding machine. The use of the two-axle kneading/extruding machine makes it possible to produce the positive electrode paste more effectively than in the case of using a batch kneader. The positive electrode paste may be manufactured using a batch kneader, as a matter of course.

EXAMPLES

The exemplary embodiments of the present invention will be described in detail below with reference to examples and comparative examples. However, the exemplary embodiments of the present invention are not limited only to the following examples.

Table 1 shows the test conditions and results of Examples 1 to 7 and Comparative Examples 1 to 6.

First, test conditions common to the positive electrode pastes according to Examples 1 to 7 and Comparative Examples 1 to 6 will be described.

$LiNi_{1/3}Co_{1/3}Mn_{1/3}O_2$ was used as the positive electrode active material. Acetylene black (Denka Black HS-100 manufactured by DENKI KAGAKU KOGYO KABUSHIKI KAISHA) was used as the conductive material. NMP (manufactured by Mitsubishi Chemical Corporation) was used as the solvent.

A KF polymer manufactured by Kureha Battery Materials Japan Co., Ltd. was used as one of the binders, i.e., as the PVdF. Specifically, KF polymer #7300 was used as the PVdF having a weight average molecular weight of 1000000. As other PVdF having various weight average molecular weights other than the weight average molecular weight of 1000000, the custom-made KR polymers which were manufactured by Kureha Battery Materials Japan Co., Ltd. by changing the weight average molecular weight were used.

A poly(vinyl butyral) resin S-LEC B manufactured by SEKISUI CHEMICAL CO., LTD. was used as the other one of the binders, i.e., as the polyvinyl acetal resin (PVA). Specifically, the custom-made S-LEC B which was manufactured by SEKISUI CHEMICAL CO., LTD. by changing the weight average molecular weight and the amount of hydroxyl group was used.

Note that the weight average molecular weight of each of the PVA and the PVdF can be measured by an absolute molecular weight measurement method using gel permeation chromatography (GPC). The hydroxyl group content in the PVA can be measured by Fourier transform type infrared spectroscopy (FT-IR).

After the content of the positive electrode active material in the solid content was fixed to 90.3 mass %, the content of the conductive material was fixed to 8.0 mass %, the content of the PVA was fixed to 0.2 mass %, and the content of the PVdF was fixed to 1.5 mass %, the weight average molecular weight and hydroxyl group content of the PVA and the weight average molecular weight of the PVdF were changed as shown in Table 1.

The ratio of the solid content was set to 66 mass %.

TABLE 1

| | PVA | | PVdF | Viscosity [mPa · s] | | Coatability | Adhesion strength [N/m] |
|---|---|---|---|---|---|---|---|
| | Average molecular weight | hydroxyl group content [mol %] | Average molecular weight | 1 s$^{-1}$ | 40 s$^{-1}$ | | |
| Comparative Example 1 | 30000 | 42 | 1000000 | 12800 | 8100 | x | 1.1(x) |
| Example 1 | 50000 | 42 | 1000000 | 13130 | 5980 | ○ | 1.2(○) |
| Example 2 | 90000 | 42 | 1000000 | 13300 | 6350 | ○ | 1.4(○) |
| Example 3 | 140000 | 42 | 1000000 | 13560 | 6870 | ○ | 1.6(○) |
| Comparative Example 2 | 180000 | 42 | 1000000 | 13700 | 8540 | x | 1.8(○) |
| Comparative Example 3 | 90000 | 35 | 1000000 | 12860 | 6800 | ○ | 1.1(x) |
| Example 4 | 90000 | 50 | 1000000 | 13400 | 6190 | ○ | 1.5(○) |
| Example 5 | 90000 | 60 | 1000000 | 13590 | 7200 | ○ | 1.6(○) |
| Comparative Example 4 | 90000 | 70 | 1000000 | 13770 | 9100 | x | 1.8(○) |
| Comparative Example 5 | 90000 | 42 | 600000 | 8700 | 6200 | ○ | 0.7(x) |
| Example 6 | 90000 | 42 | 800000 | 10340 | 6260 | ○ | 1.2(○) |
| Example 7 | 90000 | 42 | 1200000 | 15850 | 6570 | ○ | 1.7(○) |
| Comparative Example 6 | 90000 | 42 | 1400000 | 18090 | 6890 | x | 1.8(○) |

Next, a method for evaluating positive electrode pastes according to Examples 1 to 7 and Comparative Examples 1 to 6 shown in Table 1 will be described.

The viscosity was measured at two different shear rates of 1/s and 40/s by using a rheometer manufactured by Anton Paar. These two shear rates are standard shear rates which do not correspond to the low shear rate u1 (for example, about 0.1/s) or the high shear rate u2 (for example, about 10000/s). However, the viscosity at a shear rate of 1/s is an index for adhesion properties and coatability, and the viscosity at a shear rate of 40/s is an index for coatability.

In this case, the viscosity at a shear rate of 1/s is preferably 10000 to 16000 mPa/s, and the viscosity at a shear rate of 40/s is preferably 8000 mPa/s or less. If the viscosity at a shear rate of 1/s is less than 10000 mPa/s, the adhesion strength between the active material layer and the collector is insufficient. If the viscosity at a shear rate of 1/s exceeds 16000 mPa/s, the coatability deteriorates. On the other hand, if the viscosity at a shear rate of 40/s exceeds 8000 mPa/s, the coatability deteriorates.

Further, the positive electrode pastes according to Examples 1 to 7 and Comparative Examples 1 to 6 were each applied onto a band-like aluminum foil, which was used as the collector, by a die coater, and were dried by hot air for nine seconds. In this case, the ratio of the solid content was high, which made it possible to dry all the positive electrode pastes at a faster rate.

As for the coatability, whether or not the positive electrode pastes can be coated by a die coater was determined by visual observation. As a result, a positive electrode paste with no stripe was regarded as excellent (o) and a positive electrode paste with stripes was regarded as unsatisfactory (x).

As for the adhesion strength between the formed active material layer and the collector, a 90° peel test was conducted using an adhesion strength measuring instrument manufactured by A&D Company, Limited. An adhesion strength of 1.2 N/m or more was regarded as excellent, and an adhesion strength of less than 1.2 N/m was regarded as unsatisfactory.

Next, the individual conditions and evaluation results of Examples 1 to 7 and Comparative Examples 1 to 6 will be described.

Comparative Example 1

The weight average molecular weight of the PVA was 30000; the hydroxyl group content was 42 mol %, and the weight average molecular weight of the PVdF was 1000000.

Since the weight average molecular weight of the PVA was low in the positive electrode paste according to Comparative Example 1, the viscosity of the positive electrode paste at a shear rate of 40/s was 8100 mPa/s, which was slightly higher, and thus deterioration in the coatability was observed. The adhesion strength of the positive electrode paste was 1.1 N/m, which was slightly below the evaluation criteria of 1.2 N/m.

Example 1

Example 1 was carried out in the same manner as in Comparative Example 1, except that the weight average molecular weight of the PVA was increased to 50000.

In the positive electrode paste according to Example 1, the viscosity at a shear rate of 40/s was 5980 mPa/s, which was lower than that of Comparative Example 1, and the coatability of the positive electrode paste was also excellent. The viscosity at a shear rate of 1/s was 13130 mPa/s, which was higher than that of Comparative Example 1, and the adhesion strength of the positive electrode paste reached the evaluation criteria of 1.2 N/m.

Example 2

Example 2 was carried out in the same manner as in Example 1, except that the weight average molecular weight of the PVA was increased to 90000.

In the positive electrode paste according to Example 2, the viscosity at a shear rate of 40/s was 6350 mPa/s, which was higher than that of Example 1, but the coatability of the positive electrode paste was excellent. The viscosity at a shear rate of 1/s was 13300 mPa/s, which was higher than that of Example 1, and an improvement in the adhesion strength was observed.

Example 3

Example 3 was carried out in the same manner as in Examples 1 and 2, except that the weight average molecular weight of the PVA was increased to 140000.

In the positive electrode paste according to Example 3, the viscosity at a shear rate of 40/s was 6870 mPa/s, which was higher than that of Example 2, and the coatability of the positive electrode paste was excellent. The viscosity at a shear rate of 1/s was 13560 mPa/s, which was higher than that of Example 2, and a further improvement in the adhesion strength was observed.

Comparative Example 2

Comparative Example 2 was carried out in the same manner as in Examples 1 to 3, except that the weight average molecular weight of the PVA was increased to 180000.

In the positive electrode paste according to Comparative Example 2, the viscosity at a shear rate of 40/s was 8540 mPa/s, which was higher than that of Comparative Example 1, and deterioration in the coatability was observed. The adhesion strength of the positive electrode paste was higher than that of Example 3.

Comparative Example 3

Comparative Example 3 was carried out in the same manner as in Example 2, except that the hydroxyl group content of the PVA was decreased to 35 mol %.

Since the hydroxyl group content of the PVT was low in the positive electrode paste according to Comparative Example 3, the adhesion strength of the positive electrode paste was decreased to 1.1 N/m, which was slightly below the evaluation criteria of 1.2 N/m.

Example 4

Example 4 was carried out in the same manner as in Example 2, except that the hydroxyl group content of the PVA was increased to 50 mol %.

Since the hydroxyl group content was increased in the positive electrode paste according to Example 4, the adhesion strength of the positive electrode paste was increased to 1.5 N/m. Thus, the adhesion strength of the positive electrode paste was improved as compared with Example 2.

Example 5

Example 5 was carried out in the same manner as in Examples 2 and 4, except that the hydroxyl group content of the PVA was increased to 60 mol %.

In the positive electrode paste according to Example 5, the adhesion strength was 1.6 N/m. Thus, the adhesion strength was further improved as compared with Example 4.

Comparative Example 4

Comparative Example 4 was carried out in the same manner as in Examples 2, 4, and 5, except that the hydroxyl group content of the PVA was increased to 70 mol %.

In the positive electrode paste according to Comparative Example 4, the viscosity at a shear rate of 40/s was 9100 mPa/s, which was higher than that of Comparative Example 2, and deterioration in the coatability was observed. The adhesion strength of the positive electrode paste was higher than that of Example 5.

Comparative Example 5

Comparative Example 5 was carried out in the same manner as in Example 2, except that the weight average molecular weight of the PVdF was decreased to 600000.

In the positive electrode paste according to Comparative Example 5, the viscosity at a shear rate of 1/s of was decreased to 8700 mPa/s, and thus the adhesion strength of the positive electrode paste was decreased to 0.7 N/m, which was much below the evaluation criteria of 1.2 N/m.

Example 6

Example 6 was carried out in the same manner as in Comparative Example 5, except that the weight average molecular weight of the PVdF was increased to 800000.

In the positive electrode paste according to Example 6, the viscosity at a shear rate of 1/2 was 10340 mPa/s, which was higher than that of Comparative Example 5, and the adhesion strength of the positive electrode paste reached the evaluation criteria of 1.2 N/m.

Example 7

Example 7 was carried out in the same manner as in Examples 2 and 6, except that the weight average molecular weight of the PVdF was increased to 1200000.

In the positive electrode paste according to Example 7, the viscosity at a shear rate of 1/s was 15850 mPa/s, which was higher than that of Examples 2 and 6, and the adhesion strength was 1.7 N/m which was extremely excellent.

Comparative Example 6

Comparative Example 6 was carried out in the same manner as in Examples 2, 6, and 7, except that the weight average molecular weight of the PVdF was increased to 1400000.

In the positive electrode paste according to Comparative Example 6, the viscosity at a shear rate of 1/s was 18090 mPa/s, which was extremely high, and deterioration in the coatability was observed. The adhesion strength of the positive electrode paste was higher than that of Example 7.

As described above, the use of the positive electrode paste including, as binders, the PVA having a weight average molecular weight of 50000 to 140000 and including a hydroxyl group in a range from 42 to 60 mol %, and the PVdF having a weight average molecular weight of 800000 to 1200000 made it possible to improve the adhesion strength while maintaining excellent coatability.

Note that the present invention is not limited to the above embodiments and can be modified as appropriate without departing from the scope of the invention.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A positive electrode paste for a non-aqueous electrolyte secondary battery, comprising:
   a binder; and
   a positive electrode active material, wherein
   the binder comprises:
     a resin including polyvinyl acetal as a basic skeleton, the resin having a weight average molecular weight of 50000 to 140000 and having a hydroxyl group content of 42 to 60 mol %; and
     polyvinylidene fluoride having a weight average molecular weight of 800000 to 1200000.

2. The positive electrode paste according to claim 1, wherein a ratio of a solid content to the positive electrode paste is 60 mass % or more.

3. The positive electrode paste according to claim 1, wherein
   a content of the resin including polyvinyl acetal as the basic skeleton is 0.1 mass % or more in a solid content of the positive electrode paste,
   a content of the polyvinylidene fluoride is 1.0 mass % or more in the solid content, and
   a total content of the resin including polyvinyl acetal as the basic skeleton and the polyvinylidene fluoride is 3.0 mass % or less in the solid content.

* * * * *